No. 888,595. PATENTED MAY 26, 1908.
W. W. DOOLITTLE.
MOLDING MACHINE.
APPLICATION FILED NOV. 14, 1906.
2 SHEETS—SHEET 1.
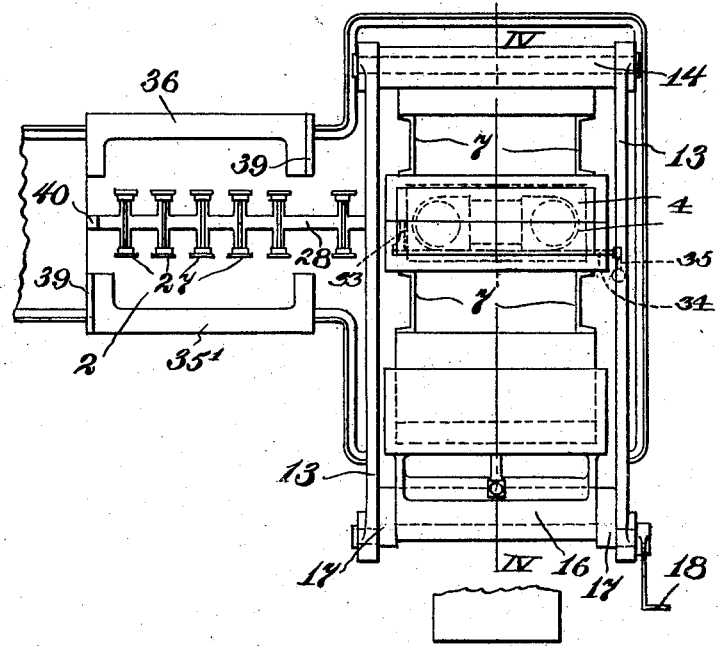
Fig. 1.
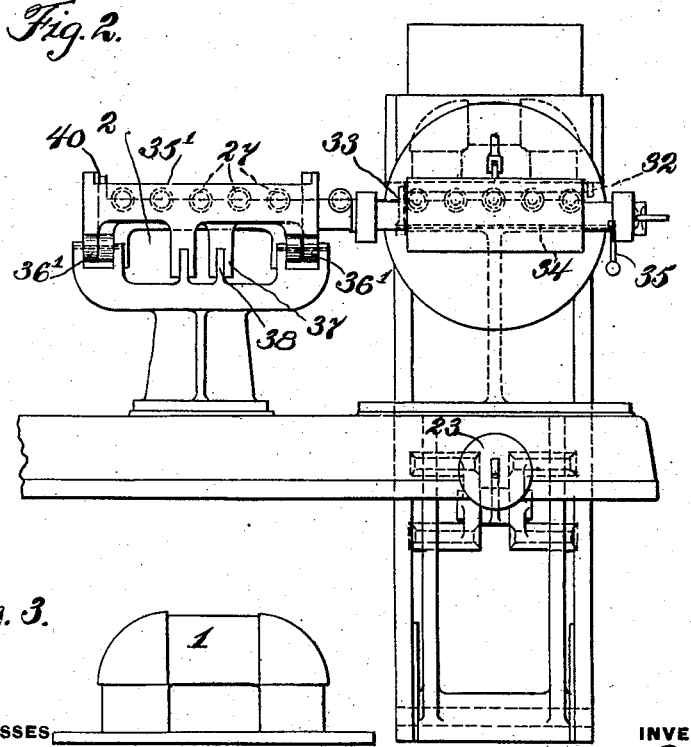
Fig. 2.
Fig. 3.
WITNESSES
Harry L. Lechner
J. C. Bradley
INVENTOR
William W. Doolittle
by attys
Synnestvedt & Carpenter

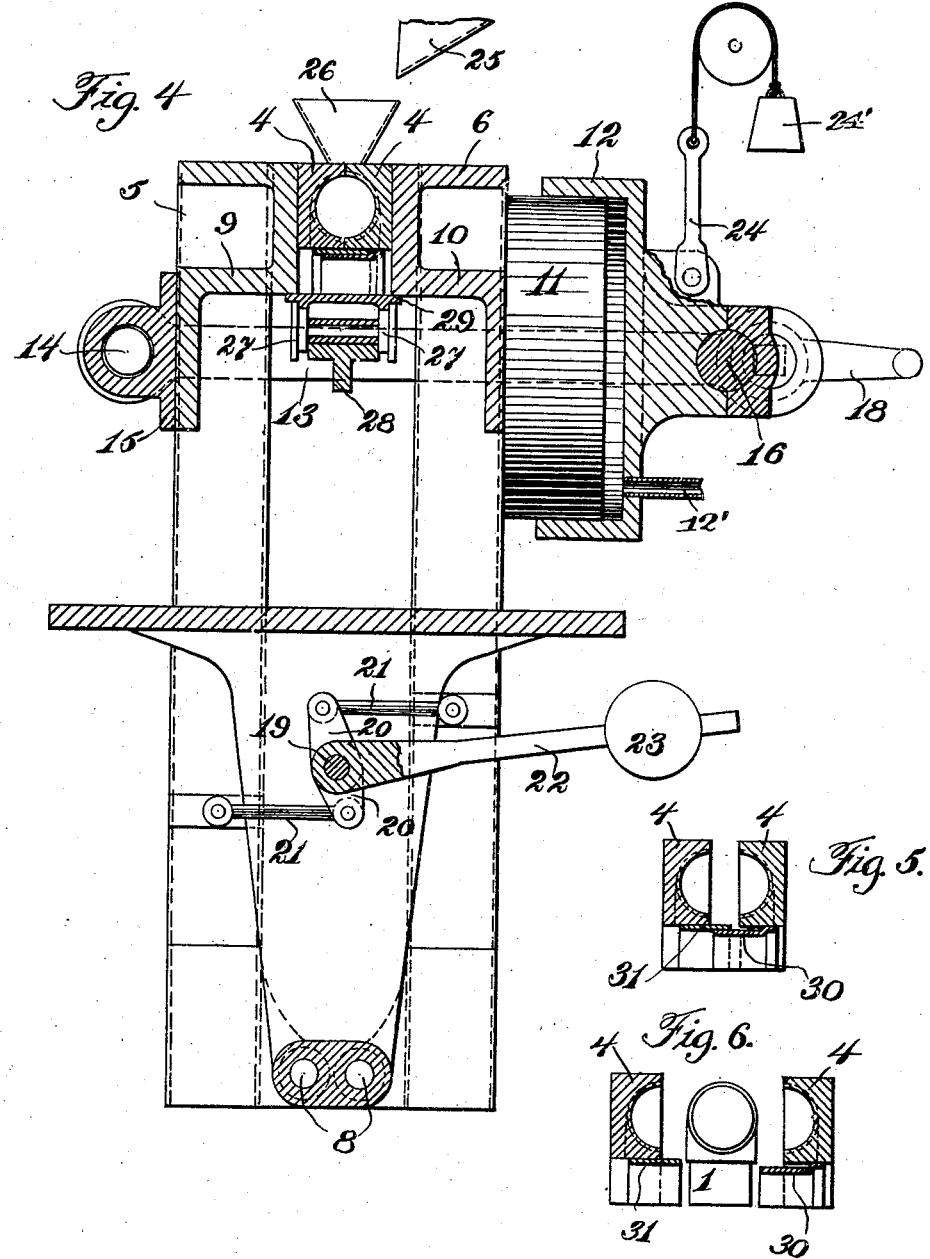

UNITED STATES PATENT OFFICE.

WILLIAM W. DOOLITTLE, OF EVANSTON, ILLINOIS, ASSIGNOR TO CRANE COMPANY, OF CHICAGO, ILLINOIS, A CORPORATION OF ILLINOIS.

MOLDING-MACHINE.

No. 888,595.  Specification of Letters Patent.  Patented May 26, 1908.

Application filed November 14, 1906. Serial No. 343,315.

*To all whom it may concern:*

Be it known that I, WILLIAM W. DOOLITTLE, a citizen of the United States, residing at Evanston, in the county of Cook and State of Illinois, have invented certain new and useful Improvements in Molding-Machines, of which the following is a specification.

My invention relates to molding machines, and particularly to machines for forming and handling green sand cores; and has for its objects, to provide a machine in which the cores may be formed with great rapidity and accuracy, and with increased economy as to power used in compressing; to provide means whereby the core formed may be transferred from its position of use without handling or jarring, and finally, to provide a core mold of increased simplicity and convenience of operation. These and other objects are accomplished by my invention, one embodiment of which is illustrated in the accompanying drawings, in which—

Figure 1 is a plan view of the assembled mechanism;

Figure 2 is a side elevation thereof;

Figure 3 is a side elevation of the core formed in the device;

Figure 4 is a transverse section through Figure 1, on the line IV–IV;

Figure 5 is a detail section showing the core mold in the position occupied during filling and preliminary to the compacting of the core, and Figure 6 is a similar section with the half molds in extreme open position to permit of the removal of the core.

The mechanism is designed primarily for the formation and handling of the green sand cores used with the molds shown in my co-pending application, Serial No. 329,887, of which this case is a division, and comprises the improved mechanism to be more fully hereinafter described, whereby the cores are completely formed upon a carrier and transferred to a position on the assembling mechanism where the sectional molds formed in the mechanism described in my co-pending application referred to are applied about the core.

The mechanism is adapted to form the core 1 shown in Figure 3 and is so arranged that when such core is formed it rests directly upon the carrier plate for transferring to the assembling mechanism 2 to which the half molds have previously been transferred for the purpose of assembling. The machine comprises in the main, two relatively movable jaws each of which is adapted to carry a half mold for forming the core, fluid pressure means for applying compressing force to these members to bring them together and connecting mechanism between the mold members whereby they may be widely separated in order to permit of the removal of the core, together with means for automatically opening the members. Referring to Figures 1, 2, and 4, it will seem that the half mold members 4—4 are carried upon supporting members 5 and 6, which members 5 and 6 comprise each a frame-work of two channels 7 placed back to back and pivoted to the main frame-work at the bottom thereof by means of the pivots 8, and carrying at the top the cast members 9 and 10 to which the half mold members are attached. The mechanism for applying fluid pressure to the mold comprises a ram having a piston 11 secured to the member 6 and a cylinder 12 secured to the member 5 by means of two connecting rods 13 extending along the sides of the mechanism and provided at one end with the transverse shaft 14 secured to the brackets 15 secured to the back of the member 5. Fluid pressure is supplied by means of a pipe 12' controlled by an ordinary three-way cock. In order that the distance between the members 4—4 may be greatly increased to permit of the removal of the core after its formation, crank connecting means between the rear side of the cylinder 12 and the connecting rods 13 is provided (see Figures 1 and 4), which crank connecting means comprises a transverse shaft 16 extending through the rear part of the cylinder 12, and end portions 17 extending rearwardly and outwardly through the ends of the connecting rods 13, thus providing an eccentric mounting for the shaft 16 one of such ends being provided with an operating crank 18 (Figure 2). By means of the crank or eccentric connecting means the mold members may be held in the position shown in Figure 4, or when the crank is moved to a position 180° from the position shown in Figure 4, such mold members may be moved to the position shown in Figure 6, in which position clearance is provided so that the core may be easily removed from between such molding members, the extent of movement of the members being equal to the throw of the eccentric. In order that the molding members may normally open to their extended positions, I have provided the automatic weight-operated mechanism shown in the lower portion of Figure 4. This mechanism comprises the shaft 19 carrying the oppositely projecting arms 20, which arms are connected by means of links 21 with the two opposing members 5 and 6. The shaft 19 is normally rotated to open the members by means of the arm 22 provided with the weight 23. The weight of the cylinder 12 may be counterbalanced by means of the arm 24 pivoted thereto and connected to a rope running over a pulley and attached to a weight 24′. The receptacle 25 is conveniently located above the machine and adapted to discharge into the hopper 26 resting on the top of the mold members. Rotatably mounted below the mold members are a series of rollers 27, which rollers are mounted upon the supporting brackets 28 and lead to the assembling mechanism 2, and are adapted to carry upon their upper side the carrier plate 29, which carrier plate is adapted to slide into a position immediately under the mold, as indicated in Figure 4, and such member constitutes, in this position, in effect a portion of the mold as the downwardly projecting ends of the core rest directly upon the top of the plate, so that after the core is formed, and the members 4—4 moved to the position of Figure 6, the carrier will be free to transfer the core from its position in the mold, and no moving or handling of the core in order to get it upon the carrier plate is necessary. In order that the sand from the hopper may not fall clear through the mold when it is in the receiving position shown in Figure 5, I provide upon the under side of such mold members the projecting parts 30—31, which members overlap and prevent the loss of sand. If desired, a single member might be used of sufficient length to extend across the opening when the molds are opened, but this is not desirable, as in such case the mold members would necessarily have to be opened unequal distances in moving to the position of Figure 6. In order that the carrier plate may be properly positioned under the molding members, two stops are necessary, the first of which—the stop 32— is located at the right of the machine (see Figure 2), and is merely a projecting lug adapted to engage the carrier plate, while the other stop, 33, is a swinging one at the left hand end of the mechanism, as shown in Figures 2 and 3, and is carried by the transverse shaft 34 which is normally held in raised position before the carrier plate by the counter-weighted lever 35. It will be apparent that this construction of core forming mechanism secures the same advantage as heretofore set forth for the mold forming mechanism in the device A of my co-pending application referred to, in that only a short power stroke is necessary and the additional stroke necessary to permit of the removal of the core is secured by means of additional mechanism.

Referring now to the assembling mechanism 2 of Figures 1 and 2, it will be noted that such mechanism comprises the removable half tables 35′ and 36 and the rollers 27 previously referred to. The half tables 35′ and 36 are movable towards and from the central rollers 27, such tables being mounted upon a series of rollers 36′ and being guided by means of a tongue-and-groove engagement with the body of the frame-work, the tables being provided with grooves 37 engaging corresponding tongues 38 on the frame-work. A stop 39 is provided at the end of each table whereby the half flasks may be positioned thereon, and the position of the carrier plate is positioned on the rollers 27 by means of a stop 40 against which the carrier plate 29 is adapted to abut.

Starting with the parts in the position shown in Figure 4, with the exception that the piston 11 is at its extreme right hand position, and the mold members 4 are separated as shown in Figure 5, the operation is as follows.—Sand being admitted to the hopper 26, pressure is applied to the piston 11 through the pipe 12′, and the mold members are moved to the position shown in Figure 4, thus compacting the sand in the mold and forming the core. In order to open the mold, the pipe 12′ is opened to the atmosphere, thus permitting the weights 23 acting upon the links 21 to separate mold members 4 to the extent indicated in Figure 5. This amount of opening will not permit the mold or core 1 to be removed endwise, and in order to secure a wider opening the operating crank 18 is moved to a position at 180° from that shown in Figure 4 thus opening the mold members 4 to the position indicated in Figure 6, at which time the carrier plate 29 may be withdrawn longitudinally from beneath the mold. The carrier plate 29 is moved along the rollers 27 until the end of plates engages the stop 40 (Figure 1) at which time the side plates 35′ and 36 carrying the halves of the mold may be brought together over the core, thus forming the completed mold. The machine is now ready for another operation, in which the steps are the same as above indicated.

Having thus described my invention and illustrated its use, what I claim as new and desire to secure by Letters Patent, is the following:

1. In combination, relatively movable molding members, a fluid-operated ram comprising a piston and cylinder having one of such parts secured to one molding member, a crank on the other of the parts of the ram and a connection between the crank and other molding member.

2. In combination, a pair of relatively movable molding members and a fluid-operated ram mounted adjacent one member, one of the parts of such ram having connection to one member and the other part of the ram to the other member, and one of such connections including a crank whereby it is changeable as to length.

3. In combination, a pair of relatively movable molding members, open at the bottom a carrier plate beneath the molding members in position to constitute a closure for the open bottom of such molding members, a track on which the carrier plate is mounted for movement longitudinally of the line of opening of the molding members, and means for opening the molding members to such an extent as to permit of the removal of the mold on the carrier plate.

4. In combination, a pair of relatively movable molding members, a carrier plate beneath the molding members, a track on which the carrier plate is mounted for movement longitudinally of the line of opening of the molding members, and means for opening the molding members to such an extent as to permit of the removal of the mold on the carrier plate.

5. In combination in a core molding machine, relatively movable sectional molding members, oppositely projecting overlapping members secured to the bottom of such sectional mold members extending out past the lower edges of the molds and adapted to prevent the passage of sand when the mold is open and being filled, a core carrier and means for removing such carrier longitudinally of the line of opening of the molding members.

6. In combination in a core molding machine, relatively movable sectional molding members, a projecting plate secured to the bottom of one member and extending beneath the bottom of the opposite member to prevent the loss of sand when the mold is open and being filled, a core carrier, and means for removing such carrier longitudinally of the line of opening of the molding members.

7. In combination, relatively movable molding members, power means for moving them together, yielding means normally tending to separate the molding members and comprising a supported shaft having secured thereto a pair of projecting operating levers, a link connecting each molding member to one of the operating levers and a counterweighted lever for operating the shaft.

8. In combination in a core molding machine a mold divided into relatively movable sections along a vertical plane and a plate secured to the bottom of one of the sections and adapted to overlap the joint between the two members when the mold is closed.

In testimony whereof I have hereunto signed my name in the presence of the two subscribed witnesses.

WILLIAM W. DOOLITTLE.

Witnesses:
PAUL CARPENTER,
JAMES NICHOLAS LORENZ.